(12) United States Patent  (10) Patent No.: US 8,573,815 B2
Mallory et al.  (45) Date of Patent: Nov. 5, 2013

(54) ILLUMINATING OPTICAL LENS FOR LIGHT EMITTING DIODE (LED)

(75) Inventors: Derek S. Mallory, Plymouth, MI (US); Brian C. Wells, Grosse Pointe, MI (US)

(73) Assignee: Coreled Systems, LLC, Livonia, MI (US)

( * ) Notice: Subject to any disclaimer, the term of this patent is extended or adjusted under 35 U.S.C. 154(b) by 111 days.

(21) Appl. No.: 12/924,328

(22) Filed: Sep. 24, 2010

(65) Prior Publication Data

US 2011/0075418 A1  Mar. 31, 2011

Related U.S. Application Data

(60) Provisional application No. 61/277,549, filed on Sep. 25, 2009.

(51) Int. Cl.
*F21V 3/00* (2006.01)
*F21V 5/00* (2006.01)

(52) U.S. Cl.
USPC ............ 362/311.02; 362/311.01; 362/311.06; 362/555; 362/326; 362/332

(58) Field of Classification Search
USPC .................. 362/235, 249.02, 249.04, 249.06, 362/249.14, 249.11, 311.01, 311.02, 555, 362/311.06, 311.1, 311.15, 326–334, 336, 362/337, 338, 340; 313/512
See application file for complete search history.

(56) References Cited

U.S. PATENT DOCUMENTS

| | | |
|---|---|---|
| 4,158,221 A | 6/1979 | Agabekov |
| 4,521,838 A | 6/1985 | Agabekov |
| 4,569,568 A | 2/1986 | Agabekov |
| 4,858,088 A | 8/1989 | Agabekov |
| 5,038,257 A | 8/1991 | Agabekov |
| 5,180,887 A | 1/1993 | Agabekov |
| 5,331,512 A | 7/1994 | Orton |
| 5,613,762 A | 3/1997 | Agabekov |
| 6,425,681 B1 | 7/2002 | Agabekov |
| 6,521,916 B2 | 2/2003 | Roberts |
| 6,641,284 B2 | 11/2003 | Stopa et al. |
| 6,726,502 B1 | 4/2004 | Hayes |
| 6,805,470 B1 | 10/2004 | Ward |
| 6,817,877 B1 | 11/2004 | Agabekov et al. |
| 6,971,767 B2 | 12/2005 | Agabekov et al. |
| 7,063,440 B2 | 6/2006 | Mohacsi et al. |
| 7,144,763 B2 * | 12/2006 | Rubinsztajn et al. ......... 438/127 |
| 7,234,840 B2 | 6/2007 | Agabekov et al. |

(Continued)

*Primary Examiner* — Jong-Suk (James) Lee
*Assistant Examiner* — Tsion Tumebo
(74) *Attorney, Agent, or Firm* — Butzel Long

(57) ABSTRACT

An illuminating optical lens article of manufacture for use with a light emitting diode (LED) mounted on a circuit board has (a) a base portion defining a rim on a plane having a bottom surface around a longitudinal axis for mounting over the LED; (b) an integral refractive outer surface of the lens extending towards the longitudinal axis from the base; (c) an integral refractive inner surface of the lens extending from the base forming a cavity shaped and sized to receive an LED; and optionally (d) a plurality of grooved sections for receiving an adhesive formed on the bottom surface of the base portion. The base is adapted to be mounted on the circuit board onto which the LED is mounted. The integral refractive outer and inner surfaces each define a predetermined geometry adapted to direct and focus light emitting from the LED to a predetermined path.

38 Claims, 11 Drawing Sheets

(56) References Cited

U.S. PATENT DOCUMENTS

| | | |
|---|---|---|
| 7,766,509 B1* | 8/2010 | Laporte .................... 362/249.02 |
| 7,841,750 B2* | 11/2010 | Wilcox et al. ................. 362/334 |
| 2006/0284305 A1* | 12/2006 | Yen et al. ...................... 257/708 |
| 2007/0019416 A1* | 1/2007 | Han et al. ...................... 362/307 |
| 2007/0030572 A1* | 2/2007 | Lee et al. ...................... 359/642 |
| 2007/0070530 A1* | 3/2007 | Seo et al. ...................... 359/819 |
| 2007/0269915 A1 | 11/2007 | Leong et al. |
| 2008/0094684 A1* | 4/2008 | Varaprasad et al. .......... 359/267 |
| 2009/0034255 A1 | 2/2009 | Li |
| 2009/0262543 A1 | 10/2009 | Ho |
| 2009/0310366 A1* | 12/2009 | Huang et al. ................. 362/298 |

* cited by examiner

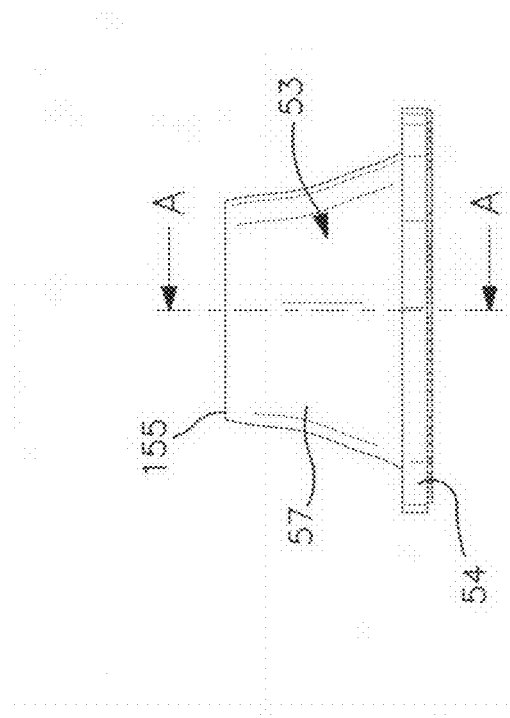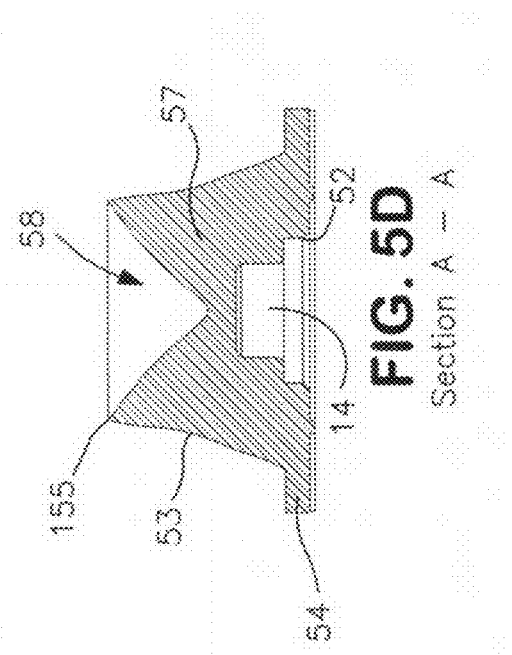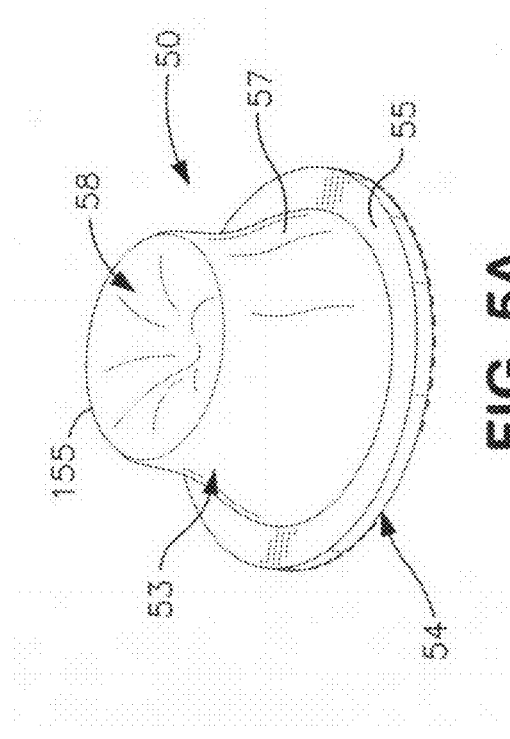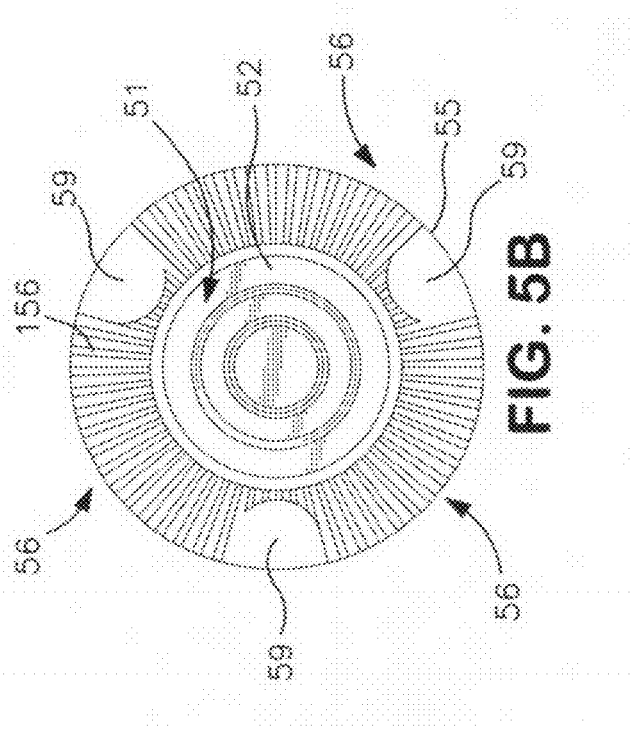

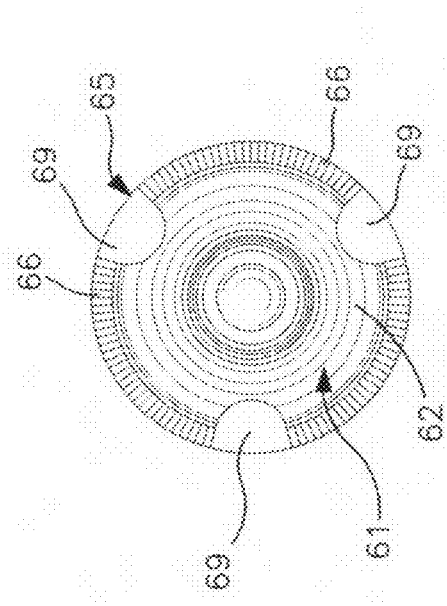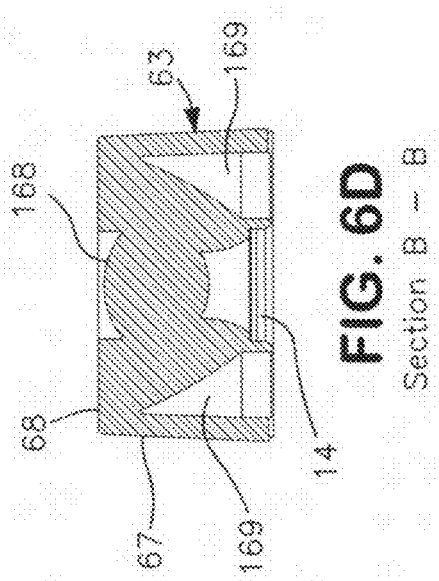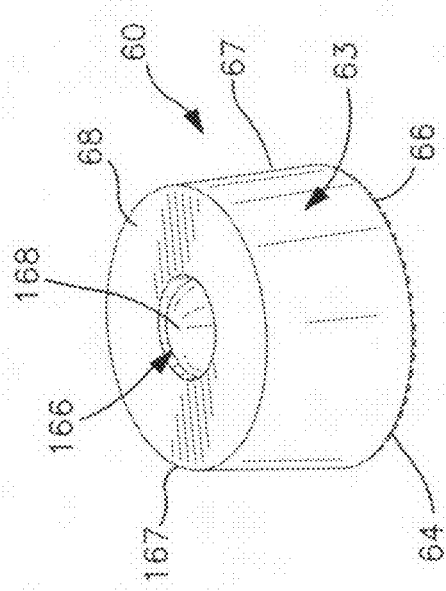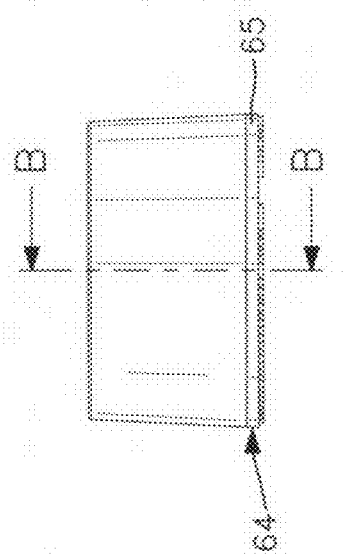

Section C – C

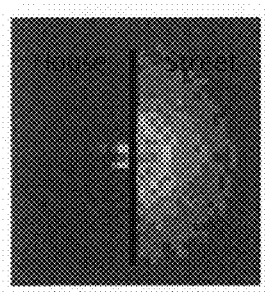 + 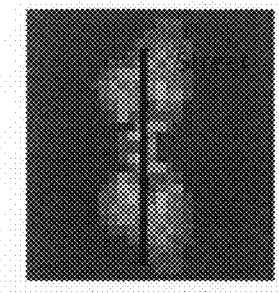 + 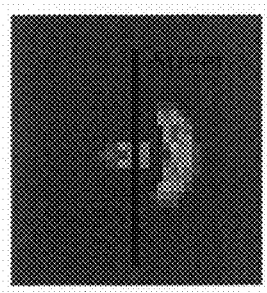
FIG. 10A    FIG. 10B    FIG. 10C
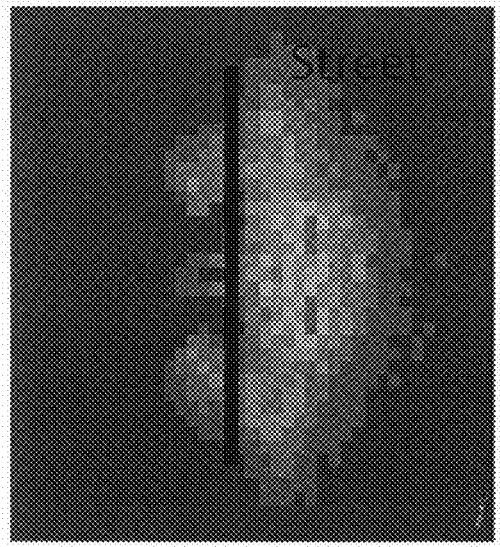
FIG. 10D

ILLUMINATING OPTICAL LENS FOR LIGHT EMITTING DIODE (LED)

CROSS-REFERENCE TO RELATED APPLICATION

Priority is claimed to U.S. Provisional Application No. 61/277,549, filed Sep. 25, 2009, the disclosure of which is incorporated herein in its entirety.

STATEMENT REGARDING FEDERALLY SPONSORED RESEARCH OR DEVELOPMENT

Non-applicable

BACKGROUND OF THE INVENTION (1) Field of the Invention

The present disclosure relates to a light emitting diode (LED) lens, lighting systems, and methods of use and manufacturing.

(2) Description of Related Art

Early light emitting diode (LED) devices emitted low-intensity red light, but modern LEDs are available across the visible, ultraviolet and infra red wavelengths, with very high brightness. LEDs are based on the semiconductor diode. When the diode is forward biased (switched on), electrons are able to recombine with holes and energy is released in the form of light. This effect is called electroluminescence and the color of the light is determined by the energy gap of the semiconductor. The LED is usually small in area (less than 1 $mm^2$) with integrated optical components to shape its radiation pattern and assist in reflection.

Early commercial LEDs were commonly used as replacements for incandescent indicators, and in seven-segment displays. First, they were used in expensive equipment such as laboratory and electronics test equipment, then later in such appliances as TVs, radios, telephones, calculators, and even watches. These red LEDs were bright enough only for use as indicators, as the light output was not enough to illuminate an area. Later, other colors became widely available and also appeared in appliances and equipment. As the LED materials technology became more advanced, the light output was increased, while maintaining the efficiency and the reliability to an acceptable level. The invention and development of the high power white light LED led to use for illumination. Most LEDs were made in the very common 5 mm T1¾ and 3 mm T1 packages, but with increasing power output, it has become increasingly necessary to shed excess heat in order to maintain reliability, so more complex packages have been adapted for efficient heat dissipation. Packages for state-of-the-art high power LEDs bear little resemblance to early LEDs.

LEDs present many advantages over traditional light sources including lower energy consumption, longer lifetime, improved robustness, smaller size and faster switching. However, they are relatively expensive and require more precise current and heat management than traditional light sources.

Applications of LEDs are diverse. They are used as low-energy indicators but also for replacements for traditional light sources in general lighting and automotive lighting. The compact size of LEDs has allowed new text and video displays and sensors to be developed, while their high switching rates are useful in communications technology.

Accordingly, applications of LEDs in high flux applications and efficiencies are still needed, particularly in luminaire systems such as street lamps on streets, sidewalks, or parking lots. A need still exists for lenses for use in LED applications that provide desired beam patterns and efficient manufacturing providing high tolerance.

OBJECTS

It is an object of the present invention to provide optical lenses and LED light fixture assemblies for use in various luminaire systems having high optical efficiencies and low manufacturing tolerances.

These and other objects of the present invention will become increasingly apparent with reference to the following drawings and preferred embodiments.

SUMMARY OF THE INVENTION

The present invention provides for an illuminating optical lens article of manufacture for use with a light emitting diode (LED) mounted on a circuit board which comprises: (a) a base portion defining a rim on a plane having a bottom surface around a longitudinal axis A-A for mounting over the LED; (b) an integral refractive outer surface of the lens extending around and angled towards the longitudinal axis A-A from the base; (c) an integral refractive inner surface of the lens extending from the base forming a cavity shaped and sized to receive an LED; and (d) optionally a plurality of grooved sections for receiving an adhesive formed on the bottom surface of the base portion. The base is adapted to be mounted on the circuit board onto which the LED is mounted. The integral refractive outer and inner surfaces each define a predetermined geometry adapted to direct and focus light emitting from the LED to a predetermined path. The lens is fabricated with a tolerance range of the inner surface within 0.15 mm of the LED. In an exemplary embodiment, the base, the outer surface, and the inner surface of the lens are formed as an integral unit fabricated from a polymer. The lens is fabricated from a polymer material through injection molding. The lens can be fabricated from an optically clear acrylic polymer. In a particular embodiment, the lens is fabricated from a polymer that is ultraviolet stabilized. In an even further embodiment, the lens is fabricated from a polymer having a refractive index of about 1.49. Typically, the base defines a diameter between about 10 mm and 20 mm. In a particular embodiment, the base defines a diameter of about 14.5 mm. The base can define an opening for the cavity around and angled towards the longitudinal axis and having a diameter between about 5.0 mm and 5.5 mm. Typically, the grooved sections are spaced apart by a plurality of flats for ejector pins. The grooved sections are adapted to receive a curable polymeric adhesive to be coated and light cured onto the circuit board. The curing polymeric adhesive is adapted to be cured by ultraviolet light. In an exemplary embodiment, the bottom surface of the base defines three equidistant grooved sections spaced apart circumferentially with three flats for ejector pins positioned there between. The lens can comprise an outer surface extending away from the base plane a distance between about 7 mm and 11 mm. The predetermined path can be selected whereby when the lens is mounted in a street lamp with a plurality of other lenses, the path emits the light onto a street with minimal light emission away from the street towards undesired locations.

In an exemplary embodiment, the lens of the present disclosure includes an outer surface that defines a conical cross-sectional geometry adapted to allow for total internal reflection (TIR). The surface has a first and second section wherein the first section extends upward with respect to the plane of the base and radially inward to a peak and the second section forms a valley extending downward and inward towards the plane of the base. In a further exemplary embodiment, the lens of the present disclosure includes an outer surface that defines a cylindrical geometry adapted to allow for TIR. The outer surface has a first section extending upward and inward from the plane of the base and a second section defining a plane substantially flat and parallel with the plane of the base defining a center cavity forming a third section with an upward curve that peaks below the plane of the second section. In an even further embodiment, the lens of the present disclosure includes an outer surface that forms a first and a second curved section extending away from the plane of the base adapted to produce an illuminating flood light pattern. The first curved section extends a distance away from the plane of the base greater than the second curved section.

The lenses according to the present disclosure are adapted to be mounted into a luminaire system of a plurality of LEDs wherein each LED is positioned into the cavity of a separate individual lens of a plurality of lenses. The luminaire system can be a plurality of LED's on a circuit board for a street lamp. In a particular embodiment, the plurality of lenses is between 20 and 100 lenses per luminaire system.

The present disclosure provides for a method for assembling an illuminating optical lens system for use with a light emitting diode (LED) comprising the steps of: (a) providing an LED mounted on a circuit board; (b) providing a lens comprising (i) a base defining a circumferential rim on a plane having a bottom surface around a longitudinal axis A-A adapted to mount to the circuit board; (ii) an integral refractive outer surface of the lens extending around and angled towards the longitudinal axis A-A from the base; (iii) an integral refractive inner surface of the lens extending from the base forming a cavity shaped and sized to receive the LED; and (iv) a plurality of grooved sections formed on the bottom surface of the base portion; (c) applying adhesive to at least one of the lens or the circuit board around the LED for mounting the lens to the circuit board; and (d) mounting the lens to the circuit board over the LED wherein the LED is positioned within the cavity formed by the inner surface of the lens. The integral refractive outer and inner surfaces each define a predetermined geometry adapted to direct and focus light emitting from the LED to a predetermined path. The lens is fabricated with a tolerance range of 0.05 mm. The adhesive can be light curable adhesive polymer. In a further exemplary embodiment, the method further comprises the step of emitting light on the adhesive polymer to cure the adhesive polymer. The emitting light is typically ultraviolet light. The adhesive polymer can be evenly distributed on the lens and/or the printed circuit board in four drops circumferentially positioned around the LED. The mounting of the lens on the circuit board causes the polymeric adhesive to distribute into the grooves of the bottom surface of the base of the lens. Steps (a)-(d) can be accomplished automatically through a preprogrammed robotic fabrication system. The method can further comprise the steps of mounting the LED and lens in a luminaire system. The luminaire system can be a plurality of LED's on a circuit board for a street lamp.

The present disclosure further provides for a luminaire system comprising: (a) a plurality of light emitting diode (LED) units mounted on a circuit board; (b) a plurality of illuminating optical lenses each mounted over and around an LED wherein each lens comprises (i) a base defining a circumferential rim on a plane having a bottom surface around a longitudinal axis A-A; (ii) an integral refractive outer surface of the lens extending around and angled towards the longitudinal axis A-A from the base; (iii) an integral refractive inner surface of the lens extending from the base forming a cavity shaped and sized to receive the LED; wherein the base is adapted to be mounted on the circuit board, and (iv) optionally a plurality of grooved sections for receiving an adhesive formed on the bottom surface of the base portion. The integral refractive outer and inner surfaces each define a predetermined geometry adapted to direct and focus light emitting from the LEDs to a predetermined path. The lens is fabricated with a tolerance range of 0.05 mm. The lenses can achieve efficiencies up to 85% for asymmetric light patterns. The lenses can achieve efficiencies up to about 92% for symmetric light patterns. The predetermined path can be symmetric or asymmetric.

BRIEF DESCRIPTION OF THE DRAWINGS

FIGS. 5A-5D illustrate an exemplary cone-like shaped optical illumination lens.

FIGS. 6A-6D illustrate an exemplary cylindrical-like shaped optical illumination lens.

FIGS. 10A-10D illustrate the application of optical design principles for an asymmetric spot light or flood light optical illumination lens.

DESCRIPTION OF PREFERRED EMBODIMENTS

Figure 1:
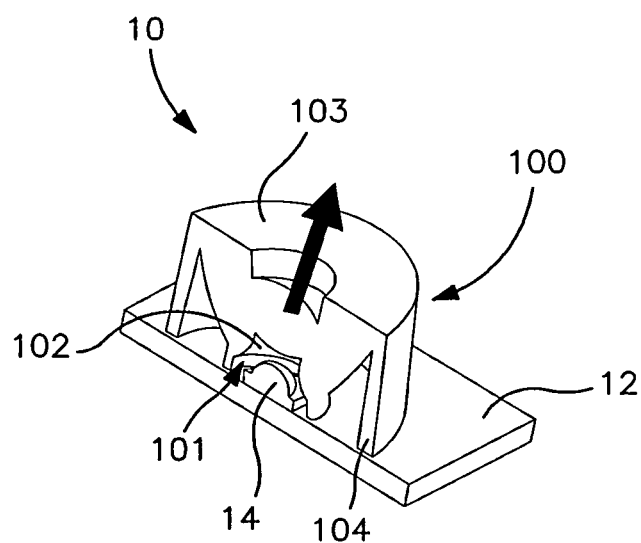
FIG. 1 illustrates an exemplary LED light fixture assembly.

All patents, patent applications, government publications, government regulations, and literature references cited in this specification are hereby incorporated herein by reference in their entirety. In case of conflict, the present description, including definitions, will control.

Optical systems and components of luminaire systems are substantially influential in achieving a desired light pattern. The present disclosure is related to apparatuses and systems for high tolerance optical lenses.

The present disclosure provides for exemplary optical lenses. The lenses are adapted to be mounted over a light emitting diode (LED). Typically the LED is mounted on a printed circuit board. The lens is fabricated to be mounted over the LED and onto the circuit board. In a particular embodiment, the lens is an illuminating lens shaped and configured to focus the light from the LED to a desired pathway. The lens can be visually transparent. Typically, the lens is fabricated from a polymer material defining a refractive index greater than air (e.g., a refractive index of at least about 1.2, 1.3, or 1.4 and/or up to about 1.5, 1.6, or 1.7). In a particular embodiment, the refractive index is about 1.49.

Applying total internal reflection (TIR), the lens can be shaped and sized to concentrate and focus the light to a desired or predetermined light pattern. TIR is an optical phenomenon that occurs when a ray of light strikes a medium boundary at an angle larger than the critical angle with respect to the normal to the surface. If the refractive index is lower on the other side of the boundary, no light can pass through and all of the light is reflected. The critical angle is the angle of incidence above which the total internal reflection occurs.

When light crosses a boundary between materials with different refractive indices, the light beam will be partially refracted at the boundary surface, and partially reflected. However, if the angle of incidence is greater (i.e. the ray is closer to being parallel to the boundary) than the critical angle (the angle of incidence at which light is refracted such that it travels along the boundary) then the light will stop crossing the boundary altogether and instead be totally reflected back internally. This can only occur where light travels from a medium with a higher refractive index to one with a lower refractive index. For example, it will occur when passing from glass to air, but not when passing from air to glass.

Each lens according to the present disclosure can be adapted to receive a single LED. The present disclosure further provides for a luminaire system comprising a plurality of LEDs having a lens mounted over it. The lenses are configured to allow for the luminaire system to illuminate a desired light pattern. In a particular example, the luminaire system is a street lamp.

The lenses can be fabricated through injection molding of plastic pieces. Suitable injection-moldable plastics with a sufficiently high optical transmission include acrylic polymers such as polymethylmethacrylate (PMMA; $n_d$=1.49) and other thermoplastic polymers such as polystyrene ($n_d$=1.59), polycarbonate ($n_d$=1.59), and poly(styrene acrylonitrile) ($n_d$=1.57). Throughput of the molding process can be increased by using multi-cavity tooling where many lenses are formed simultaneously. The lens can be mounted over the LED to form a lighting fixture comprised of a printed circuit board, an LED mounted on the circuit board, and a lens mounted over the LED and on to the circuit board. Manual or automatic assembly of the lighting fixture can be used. Automated assembly can be preprogrammed and robotic allowing for increased precision, efficiency, and repeatability. The lenses can be manufactured to be within a highly precise tolerance range with respect to the LED. The tolerance range relates to the efficient focusing and light distribution of the lens in relation to the LED. For example, if the lens is outside a certain tolerance range distance from the LED, then much of the desired light reflection and/or refraction will be lost or redirected along an undesired pathway. To achieve the desired angles of reflection and/or refraction from the light of the LED through the lens material, the inner surface of the lens and outer surface of the lens are precisely configured. These parameters can be defined into the automated fabrication and assembly systems and with robotic programming, repeatability is improved. For asymmetrical light patterns, lenses according to the present disclosure are capable of reaching efficiencies of up to about 85%. For symmetrical light patterns, lenses according to the present disclosure are capable of reaching efficiencies of up to about 92%. More generally, symmetric or asymmetric light patterns and their corresponding lenses suitably have efficiencies of at least about 70%, 80%, 85%, or 90% and/or up to about 85%, 90%, 95%, or 99%.

Referring to the Figures, FIG. 1 illustrates a cross-section view of an exemplary light fixture assembly 10 for mounting into a luminaire system such as the street lamp shown in FIG. 4A-4C to be described in more detail below. Assembly 10 comprises a printed circuit board (PCB) 12 having an LED 14 mounted thereon. An exemplary lens 100 according to the present disclosure is mounted to the PCB 12. Lens 100 defines an internal cavity 101 for receiving the LED 14. Lens 100 is fabricated from a polymer that defines a refractive index greater than air. In an exemplary embodiment, the polymer is optically clear acrylic polymer having a refractive index of about 1.49. The polymer should be ultraviolet (UV) stabilized. Light from the LED 14 will bend through lens 100. Applying Snell's law and TIR, a unique internal geometry for the internal surface 102 of the lens 100 can be configured and constructed to form a desired light pattern. A desired light pattern, for example a spot light to a desired location like a street or sidewalk, is further achievable through configuration and construction of the outer surface 103 using Snell's law and principals of TIR.

In optics and physics, Snell's law (also known as Descartes' law or the law of refraction), is a formula used to describe the relationship between the angles of incidence and refraction, when referring to light or other waves, passing through a boundary between two different isotropic media, such as water and glass. In optics, the law is used in ray tracing to compute the angles of incidence or refraction, and in experimental optics to find the refractive index of a material. The law says that the ratio of the sines of the angles of incidence and of refraction is a constant that depends on the media. Snell's law is also satisfied in the metamaterials which allow light to be bent "backward" at a negative index, however the angle of refraction has here a negative value. Oddly, light traveling "backward" in a vacuum can exceed the standard speed of light, actually arriving before leaving, albeit the laws of causality are intact because it is still light (C) that is measured. Snell's law states that the ratio of the sines of the angles (θ) of incidence and refraction is equivalent to the ratio of velocities (v) in the two media, or equivalent to the opposite ratio of the indices of refraction:

$$\frac{\sin\theta_1}{\sin\theta_2} = \frac{v_1}{v_2} = \frac{n_2}{n_1} \text{ or } n_1\sin\theta_1 = n_2\sin\theta_2.$$

When light travels from a medium with a higher refractive index to one with a lower refractive index, Snell's law seems to require in some cases (whenever the angle of incidence is large enough) that the sine of the angle of refraction be greater than one. This of course is impossible, and the light in such cases is completely reflected by the boundary, a phenomenon known as total internal reflection (TIR). The largest possible angle of incidence which still results in a refracted ray is called the critical angle; in this case the refracted ray travels along the boundary between the two media.

In an exemplary embodiment, LED 14 is positioned in the focal point of lens 100. This allows for more accurate and precise light distribution through lens 100. The LED can be any color, but typically white. Some LEDs are operable to achieve 80 lumens per watt or more and more particularly 100 lumens per watt or more. Since LEDs are highly efficient, more of the energy is distributed in to light energy rather than heat. This allows for the lenses to be placed in close proximity of the LED surface. In a particular embodiment, lens 100 defines a rounded internal wall or surface 102. The lens 100 can be fabricated and assembled into light fixture assembly 100 within a tolerance range of the LED 14 of about 0.15 mm or better. Manufacturing of lenses with high tolerance significantly improves efficiency and photometric performance.

Lens 100 generally defines a base 104 on a base plane for mounting on the PCB 12. In particular embodiments, base 104 comprises a rim as shown in the lens embodiments of FIGS. 5A-5D and 7A-7F that extends radially on the base plane. Base 104 can be circular and typically defines a diameter of between about 10 mm to 20 mm. The diameter of base 104 is dependent upon the size of the corresponding LED and the resultant light pattern. Likewise, the height of the lens 100 is dependant upon the same factors and typically is formed at a height between about 7 mm to 11 mm. The height of the lens extends away from the base plane of base 104 in an axial direction perpendicular to the base plane. Forming lenses of less than 10 mm height or thickness is attainable through injection molding to a high precision of about 0.05 mm surface tolerance. In a particular embodiment, the lens tolerance as placed to the LED is within about 0.1 mm in the axial direction with respect to the base plane and about 0.2 mm in the base plane. The precise tolerance of the lens to LED placement significantly influences accurate light beam output.

Figure 2A:
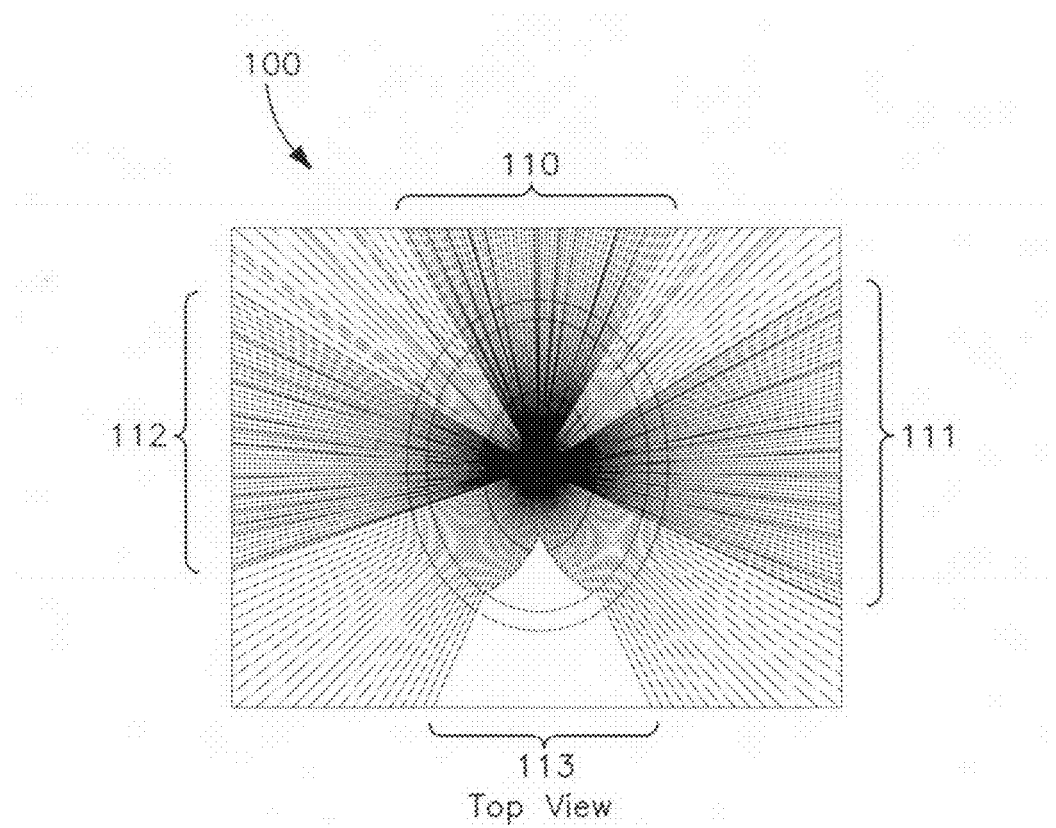
FIGS. 2A-2B illustrate simulated random light ray distribution for an exemplary optical lens.
Figure 2B:
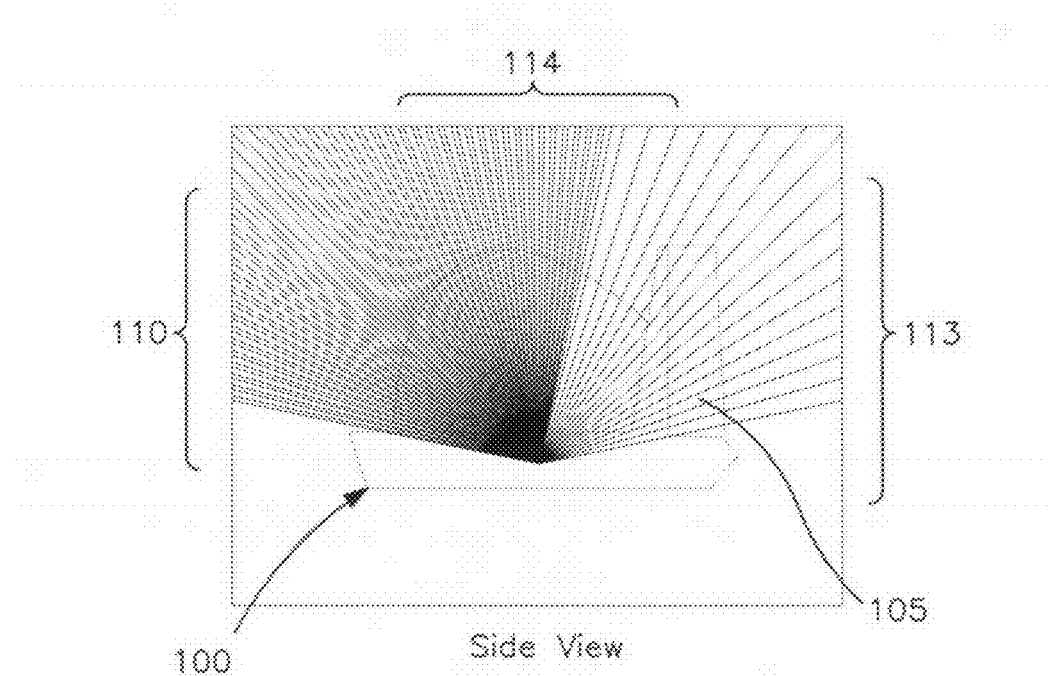

FIGS. 2A-2B illustrate a computer simulation of light ray distribution through an exemplary lens according to the present disclosure. The lens 100 can be formed to create a particular light beam pattern. For example, the lens is formed to allow for light rays to distribute out of the lens axially with respect to the base plane of the lens and in substantially three of four planar coordinate directions. This can be considered an illuminating spot light lens and is operable to function in street lamp that illuminates the street and minimizes light towards homes or structures along the street but behind the street lamp. This is an efficient and desirable light application since it reduces wasted light towards buildings and structures and focuses most of the light to the street or sidewalk.

FIG. 2A shows a simulated light ray distribution top view of lens 100. All of the light is distributed away from the base plane. The shape of the lens 100 causes most of the light rays to emit in a forward direction 110 or to the right side 111 or left side 112. This particular lens comprises an integral backstop portion 105 that generally reflects the light back to sides 110, 111, and 112. This substantially minimizes how much light distributes to backside 113. The FIGS. 2A-2B show significant ray concentration in sections 110, 111, and 112 as well as the axial direction 114. At the same time, light ray density is much lower and spread out in the direction of backside 113.

Figures 3A, 3B:
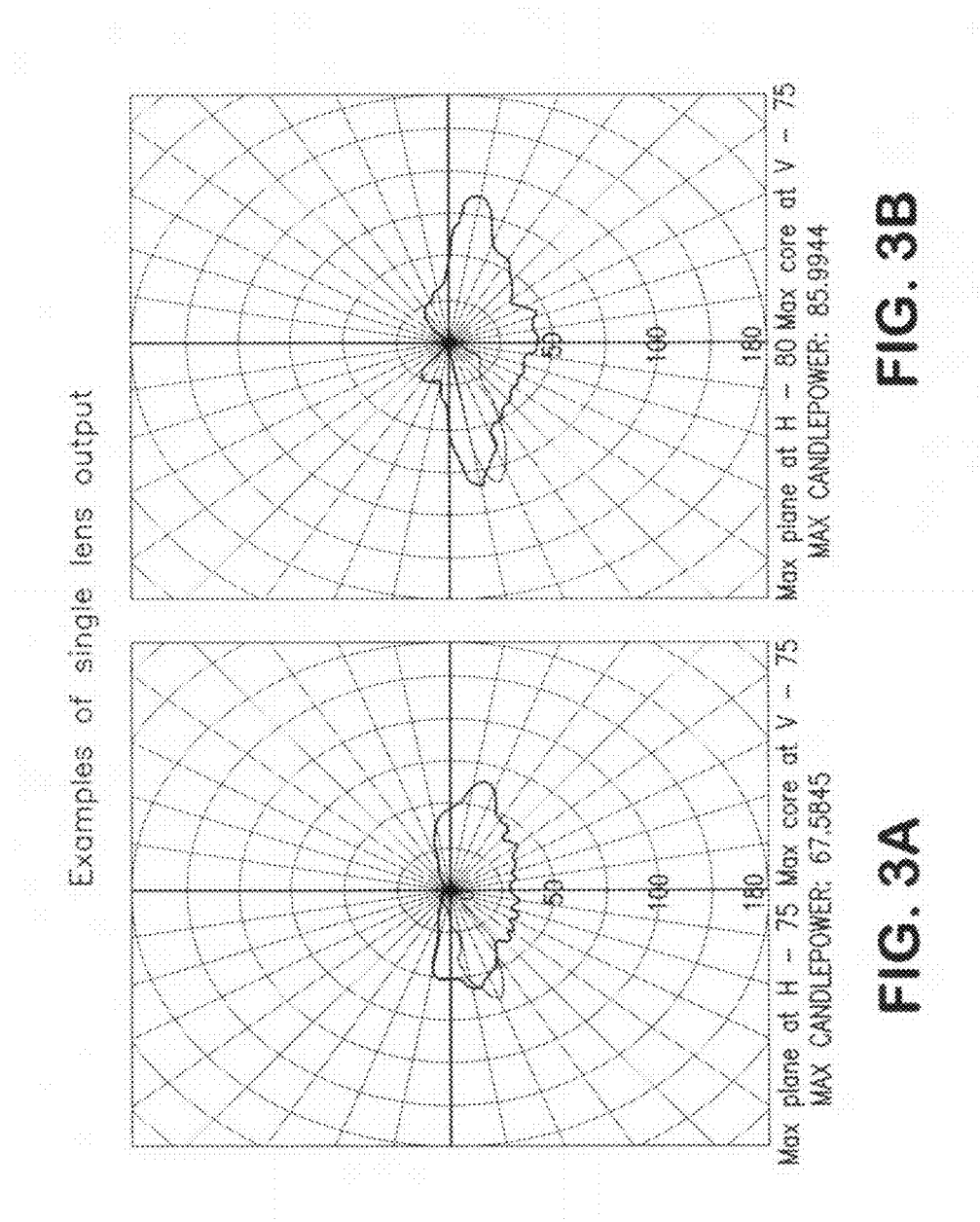
FIGS. 3A-3B illustrate example single lens light output data.

FIGS. 3A-3B show two examples of single lens light distribution output data. These graphs represent standard output for luminaire light distribution measurements. The two contour lines shown in each graph represent the candlepower distribution along a polar sweep while holding the second angle constant. The second angle is held constant at precisely the angle that represents the maximum candlepower point in the light distribution. The horizontal angle progresses from 0 to 360 degrees, with a full sweep representing one full rotation in the horizontal plane. The vertical angle progresses from 0 (straight down) to 180 degrees (straight up). The combination of these two angles can therefore scan all possible directions. The contour in a vertical plane holds the horizontal angle fixed at the horizontal angle of maximum candlepower. Similarly, the contour in a horizontal core holds the vertical angle fixed at the vertical angle of maximum candlepower. For the lens represented in FIG. 3A, maximum candlepower is 67.5845 and occurs at 75 degrees in the horizontal direction and 75 degrees in the vertical direction. The figure therefore shows a vertical contour of candlepower in the plane fixed at H=75 degrees and a second contour of candlepower in the core with the vertical angle fixed at V=75 degrees. FIG. 3B shows the light distribution of a second lens whose maximum candlepower is 85.9944 and occurs at 80 degrees in the horizontal direction and 75 degrees in the vertical direction. For both of these sample lenses, the asymmetrical pattern shown in the horizontal contour indicates most of the light distribution projects into one half of the horizontal plane.

Figure 4C:
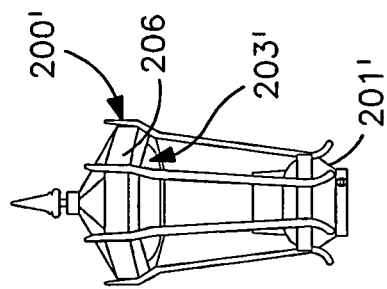
FIGS. 4A-4C illustrate exemplary luminaire systems incorporating LEDs and lenses of the present disclosure.
Figure 4B:
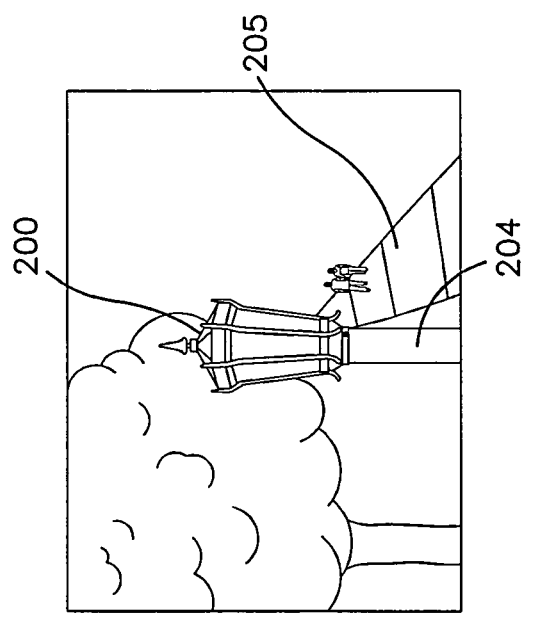
Figure 4A:
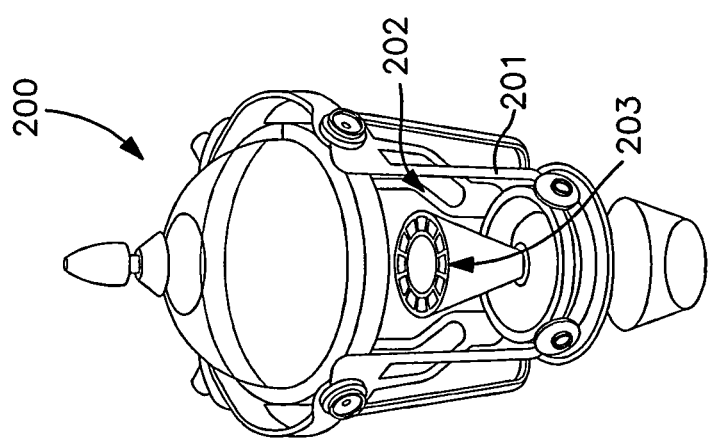

FIGS. 4A-4C illustrates exemplary luminaire systems comprising LEDs and lenses of the present disclosure. FIG. 4A shows a street lamp light fixture 200 comprising a frame 201 and defining a cavity 202 within frame 201 for mounting an LED light fixture assembly 203. Assembly 203 comprises a plurality of LEDs 14 arranged to produce a desired light pattern. Each LED 14 is mounted on a circuit board 12 and is mounted within an optical illumination lens 100. The lenses are fabricated within a sufficient surface tolerance to produce a desired light beam pattern and illumination strength. FIG. 4B shows an exemplary street lamp 200 mounted on a street lamp post 204. Lamp 200 is placed on or near a sidewalk 205 to provide light to the surrounding area. Although lenses 100 can be shaped and sized to illuminate symmetrically to areas below the lamp, the lenses can also be shaped to illuminate specific predetermined areas. For example, it may be desirable to focus the light from the LEDs in lamp 200 to the sidewalk 205 since that area generally receives more of the foot traffic.

FIG. 4C shows an alternative embodiment of a street lamp light fixture 200' having a frame 201' and a light fixture assembly 203' having a plurality of LEDs and lenses 100. Assembly 203' in this particular embodiment is mounted on an upper section 206 of frame 201'. This is a particular alternative to the embodiment of FIG. 4A where assembly 203 is mounted in a center position in cavity 202 of frame 201. The position of the light fixture assembly within the cavity of the frame of the street lamp is dependent upon the desired beam patterns. Assembly 203 of FIG. 4A, in a particular embodiment, can comprise 24 to 36 lenses 100 per lamp 200. In FIG. 4C, lamp 200', in a particular embodiment, comprises about 80 lenses. The lenses can be configured to produce an individual beam path or to cooperate in a cluster or group of other lenses to produce a collective beam path. Typically, a luminaire system will use between 20 and 100 light fixture assemblies, each having an LED and a lens according to the present disclosure.

FIGS. 5A-5D illustrates an exemplary lens embodiment of lens 50. Lens 50 comprises a base 54 defining a base plane, an outer surface body 53 extending away from the base plane. As shown in FIG. 5C, outer surface 53 generally defines a conical section geometry. Outer surface 53 is generally symmetrical and allows for generally symmetrical light distribution. Base 54 is typically circular and comprises a circular base rim 55. As shown in FIG. 5B, an opening forming a cavity 51 is defined within base rim 55 and is shaped to receive an LED 14. Internal surface 52 is sized and shaped to cooperate with outer surface 53 to produce a desired light pattern, i.e., a symmetrical spot light. Surfaces 52 and 53 are formed using principles of TIR and Snell's Law.

FIG. 5C shows a side view of lens 50 and FIG. 5D shows a cross section view along A-A. Outer surface 53 comprises a first section 57 and a second section 58. First section 57 rises away from base 54 in a slightly inward direction thus forming a generally cone-like shape. First section 57 rises up to upper rim 155. Upper rim 155 is formed at the intersection of first section 57 and second section 58. Second section 58 forms back towards base 54 inwardly generally forming a valley. In a particular embodiment, first section 57 is curved rather than linear.

FIG. 5B illustrates a bottom view of lens 50. Base rim 55 is generally circular and rests in the plane defined by base 54. An opening forming a cavity 51 is defined within the rim. The cavity is shaped along inner surface 52 is adapted to receive an LED 14. Typically, rim 55 comprises a bottom surface having groove sections 56 formed thereon. Groove sections 56 comprise a plurality of grooves 156. Grooves 156 are operable to receive an adhesive polymer for mounting on a circuit board. The surface area adhesion is increased by the presence of grooves as opposed to a generally flat surface thus increasing the strength in adhesion. In a particular embodiment, the bottom surface of rim 55 comprises three groove sections 56 spaced apart equidistantly and circumferentially. Each groove section 56 is spaced apart by a flat section 59 formed for ejector pins used in the injection molding process. In the molding process, ejector pins allow for uniform ejection of the polymer when forming the lens.

The grooved sections 56 need not be incorporated into the base 54 of the lens 50, and more generally any suitable conventional method (chemical, mechanical, or otherwise) can be used to secure a lens according to the disclosure to a substrate such as a printed circuit board containing an LED light. In addition to or instead of the use of a chemical adhesive, various mechanical methods can be used to fix the lens to the substrate. For example, the substrate can include a plurality of protruding pins adapted to receive and snap-fit the lens base to the substrate. Alternatively or additionally, the base can itself include protruding pins that snap-fit into complementary recesses or other structures on the substrate. In another embodiment, a portion of the lens base (e.g., the rim 55) can be designed to have an asymmetric shape that is complementary to or otherwise meshes or interlocks with other adjacent lens bases/rims such that a plurality of lenses can be positioned on the substrate in a predetermined, fixed pattern or arrangement.

In a particular embodiment, lens 50 defines a base diameter of about 14.5 mm and a height from base 54 to upper rim 155 of up to about 11 mm. The opening in the rim can be between 5 mm and 6 mm. The distance from the top of the LED to the upper rim 155 is between about 7 mm to 8 mm.

FIGS. 6A-6D illustrate an exemplary lens embodiment of lens 60. Lens 60 comprises a base 64 defining a base plane and an outer surface body 63 extending away and slightly inward from the base plane. As shown in FIGS. 6A and 6C, outer surface 63 generally defines a cylindrical geometry with the cylindrical length surface, first section 67 of outer surface 63, tilted slightly inward towards an upper rim 167. Outer surface 63 is generally symmetrical and allows for generally symmetrical light distribution. Base 64 is typically circular and comprises a circular base rim 65 having a bottom surface of groove sections 66 and flats 69 for ejector pins. As shown in FIG. 6B, an opening forming a cavity 61 is defined within base rim 65 and is shaped to receive an LED 14. Internal surface 62 is sized and shaped to cooperate with outer surface 63 to produce a desired light pattern, i.e., a symmetrical spot light. Lens 60 can receive a differently sized and shaped LED than that of lens 50. Surfaces 62 and 63 are formed using principles of TIR and Snell's Law. In an exemplary embodiment, inner surface 62 further comprises a wedged cutout 169 that expands circumferentially around the LED.

FIG. 6C shows a side view of lens 60 and FIG. 6D shows a cross section view along B-B. Outer surface 63 comprises a first section 67, a second section 68, and a third section 168. First section 67 rises away from base 64 in a slightly inward direction thus forming a generally cylindrical shape. First section 67 rises up linearly to upper rim 167. Upper rim 167 is formed at the intersection of first section 67 and second section 68. Second section 68 forms a parallel surface to base 64 which generally resembles a disc. An upper surface cavity 166 is generally defined in the center of second section 68. A third section 168 is formed in the cavity as an upward curved surface with a peak forming below the second surface 68.

FIG. 6B illustrates a bottom view of lens 60. Base rim 65 is generally circular and rests in the plane defined by base 64. An opening forming a cavity 61 is defined within the rim. The cavity is shaped along inner surface 62 is adapted to receive an LED 14. Typically, rim 65 comprises a bottom surface having groove sections 66 formed thereon. Groove sections 66 comprise a plurality of grooves 166. Grooves 166 are operable to receive an adhesive polymer for mounting on a circuit board. The surface area adhesion is increased by the presence of grooves as opposed to a generally flat surface thus increasing the strength in adhesion. In a particular embodiment, the bottom surface of rim 65 comprises three groove sections 66 spaced apart equidistantly and circumferentially. Each groove section 66 is spaced apart by a flat section 59 formed for ejector pins used in the injection molding process. In the molding process, ejector pins allow for uniform ejection of the polymer when forming the lens.

In a particular embodiment, lens 60 defines a base diameter of about 14.5 mm and a height from base 64 to upper rim 167 of up to about 8 mm. The peak of cutout 169 can be up to about 6.1 mm from base 64. The opening in the rim can be between 5 mm and 6 mm as well as the diameter of the upper cavity 166. The diameter of the second surface 168 can be about 13.8 mm.

Figure 7A:
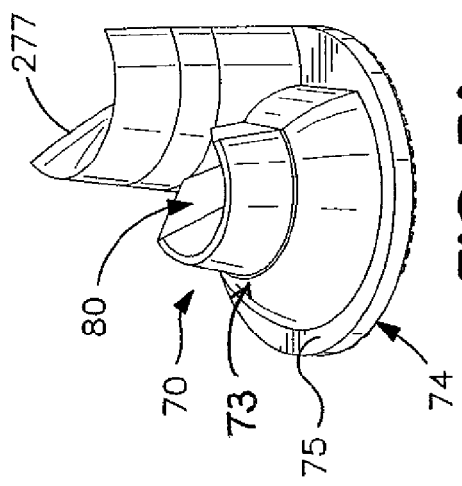
FIGS. 7A-7F illustrate an exemplary asymmetric spot light optical illumination lens.
Figure 7B:
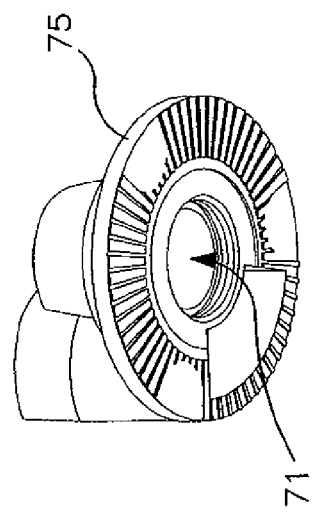
Figure 7C:
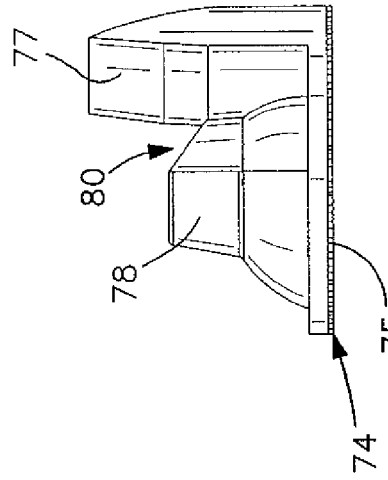
Figure 7D:
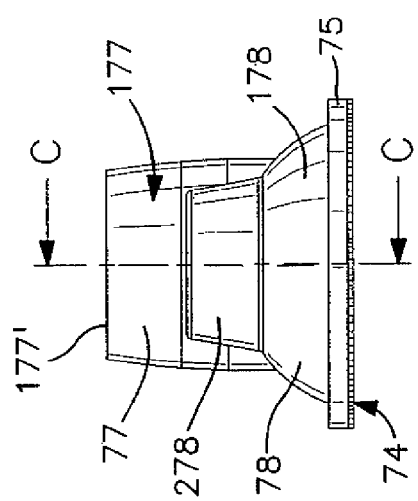
Figure 7E:
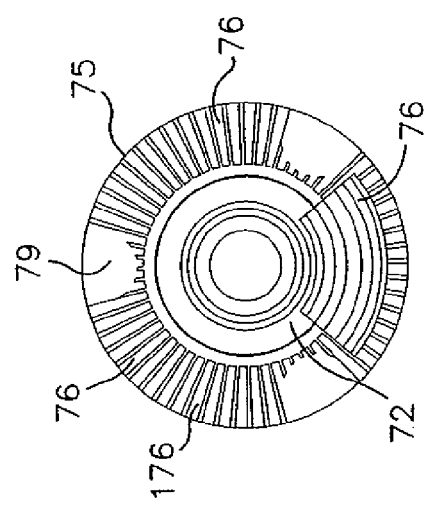

FIGS. 7A-7F illustrate an exemplary lens embodiment of lens 70. Lens 70 comprises a base 74 defining a base plane and an outer surface body 73 forming geometry adapted to produce an illuminating flood light pattern in a particular direction. Outer surface 73 generally comprises a first section 77 as a backstop and a second section 78 shorter in distance from base 74 than first section 77. Base 74 is typically circular and comprises a circular base rim 75 having a bottom surface of groove sections 76 and flats 79 for ejector pins. As shown in FIGS. 7B and 7E, an opening forming a cavity 71 is defined within base rim 75 and is shaped to receive an LED 14. Internal surface 72 is sized and shaped to cooperate with outer surface 73 to produce a desired light pattern, i.e., an asymmetrical flood light pattern distributing light to one area and not another. Surfaces 72 and 73 are formed using principles of TIR and Snell's Law. Inner surface 72 can further define a wedged cutout 179 that generally is formed in first section 77 having a height higher than the height of the LED 14.

Figure 7F:
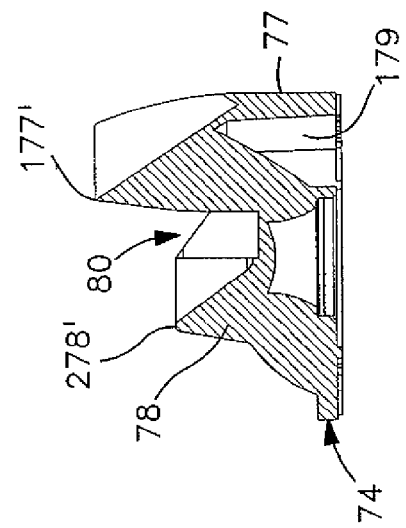

FIG. 7C shows a side view of lens 70, FIG. 7D a front view, and FIG. 7F shows a cross section view along C-C. Outer surface 73 comprises a first section 77, a second section 78, and a valley section 80 therebetween. First section 77 functions as a light backstop and rises away from base 74 to a peak 177'. Section 77 comprises a partially curved portion 177 that curves towards second section 78. Section 77 further defines an outer wedged surface 277. Second section 78 extends from base 74 having a first upward partially curved portion 178 and an upward wedged portion 278 extending therefrom to a peak 278'. A valley portion 80 is formed between the first and second sections.

FIGS. 7B and 7E illustrate a bottom view of lens 70. Base rim 75 is generally circular and rests in the plane defined by base 74. An opening forming a cavity 71 is defined within the rim. The cavity is shaped along inner surface 72 is adapted to receive an LED 14. Typically, rim 75 comprises a bottom surface having groove sections 76 formed thereon. Groove sections 76 comprise a plurality of grooves 176. Grooves 176 are operable to receive an adhesive polymer for mounting on a circuit board. The surface area adhesion is increased by the presence of grooves as opposed to a generally flat surface thus increasing the strength in adhesion. In a particular embodiment, the bottom surface of rim 75 comprises three groove sections 76 spaced apart equidistantly and circumferentially. Each groove section 76 is spaced apart by a flat section 79 formed for ejector pins used in the injection molding process.

In the molding process, ejector pins allow for uniform ejection of the polymer when forming the lens. Lens 70 is operable to be incorporated in a luminaire system that allows for directed lighting to streets and sidewalks while minimizing light distribution to undesired areas such as buildings, houses, and other structures.

Figure 8:
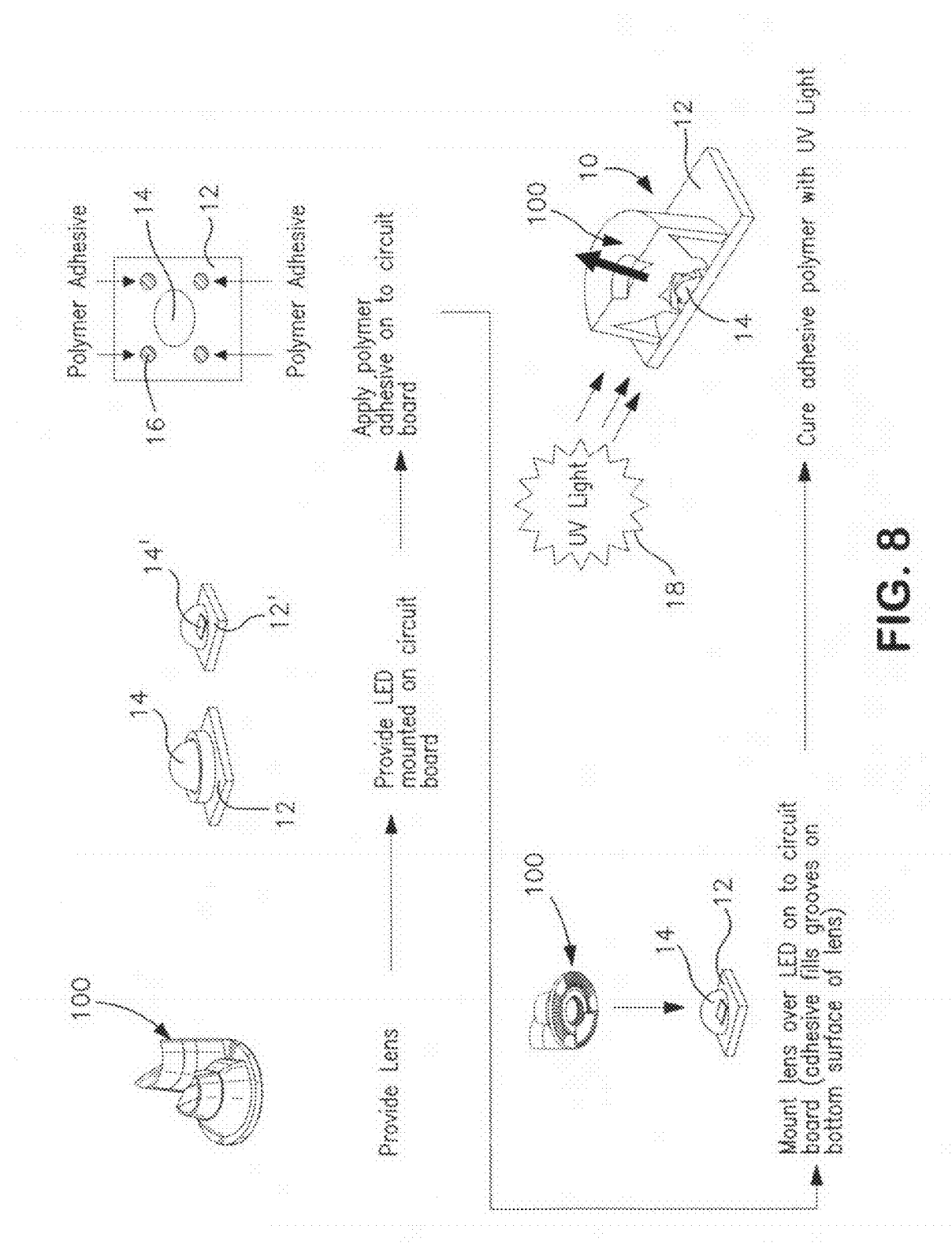
FIG. 8 illustrates a flow diagram of an exemplary LED light fixture assembly.

FIG. 8 illustrates an exemplary light fixture assembly process according to the present disclosure. Efficient manufacturing of light fixtures incorporating lenses of the present disclosure is desirable. Increasing throughput along with maintaining high tolerance for lens fabrication and LED light fixture assemblies reduces cost and improves implementation. According to FIG. 8, the present disclosure provides for an assembly process comprising the steps of providing a lens 100 and providing an LED 14 for 14' mounted on a circuit board 12 or 12' respectively. Polymer adhesive 16 is then applied equidistantly on the circuit board 12 or 12' around LED 14 or 14'. The polymer adhesive can be glue and should be curable through UV exposure. An epoxy glue is suitable and can be applied to the circuit board in dots. The lens 100 is then mounted over the LED 14 or 14' on circuit board 12 or 12' such that the adhesive aligns and fills the grooves on the bottom surface of lens 100. The mounting of lens 100 on circuit board 12 forms a LED light fixture assembly 10. Assembly 10 is then exposed to UV light from a UV light source 18. The UV light 18 cures the adhesive polymer forming a strong adhesive bond for the lens 100 on the circuit board 12 or 12'.

Assembly of light fixture assemblies is preferably automated through robotic manufacturing processes. Utilizing multi-cavity systems, throughput can be increased while maintaining high tolerance. In an exemplary 2-cavity system, 280 units per hour can be fabricated. A four cavity mold apparatus can produce 560 units per hour. An automated assembly process can produce over 1000 placements per hour. Applying the adhesive directly on to the lens and/or the circuit board allows for repeatability and high volume applications.

EXAMPLE

The following example illustrates the application of the above general design principles (e.g., including Snell's Law and total internal reflection (TIR)) to select a lens geometry having desired light focusing/spreading characteristics, for example when used in combination with a particular LED light source. Simulated light patterns for the lenses illustrated in FIGS. 6A-6D and 7A-7F are shown.

Lenses and their component surfaces are suitably designed computationally using conventional ray tracing/simulation software (e.g., LIGHTTOOLS software available from Optical Research Associates, Pasadena, Calif.) taking into account the physical properties (e.g., refractive index) of the lens material (e.g., PMMA or other polymer). A design paradigm is selected based on the manner in which the light emanating in generally all directions from a LED light source is desired to be focused/redirected by the lens (e.g., a desired final or far field pattern goal). For example, it may be desirable to focus the LED light such that a substantial majority of the light exiting the lens is parallel or substantially parallel with the longitudinal axis defined by the lens. Alternatively, it may be desirable to asymmetrically redirect the LED light in one or more specific directions relative to the longitudinal axis defined by the lens. Based on the manner in which it is desired to divide/redirect the LED light source, a lens is formed from one or more (generally a plurality of) sub-surfaces (or facets) that locally behave as a particular type of optical element such that the lens as a whole produces a composite/additive emitted light beam pattern in the desired direction(s). Example optical elements that can be incorporated into localized surface areas of the lens include convex optical elements (for focusing light rays), concave optical surfaces (for diverging light rays), reflective surfaces (e.g., a mirror surface to reflect light regardless of incidence angle), and TIR surfaces (for reflecting light rays depending on depending on incidence angle).

A simulation for a selected lens geometry in combination with a LED light source is then performed to characterize the emitted light pattern as a function of lens geometry and LED light source. The LED light source is suitably characterized by specifying the intensity and color/wavelength of LED-emitted light as a function of emission direction. The characterization can be performed by measuring actual emitted rays from a LED source and matching the emitted light to a light source model/simulation program (e.g., using a SIG-400 LED measurement near field photo goniometer available from Radiant Imaging, Redmond, Wash.). The simulation results from a particular lens geometry/LED sight source combination can be used to identify further refinements to the lens geometry (e.g., in an iterative process), if desired.

Figure 9A:
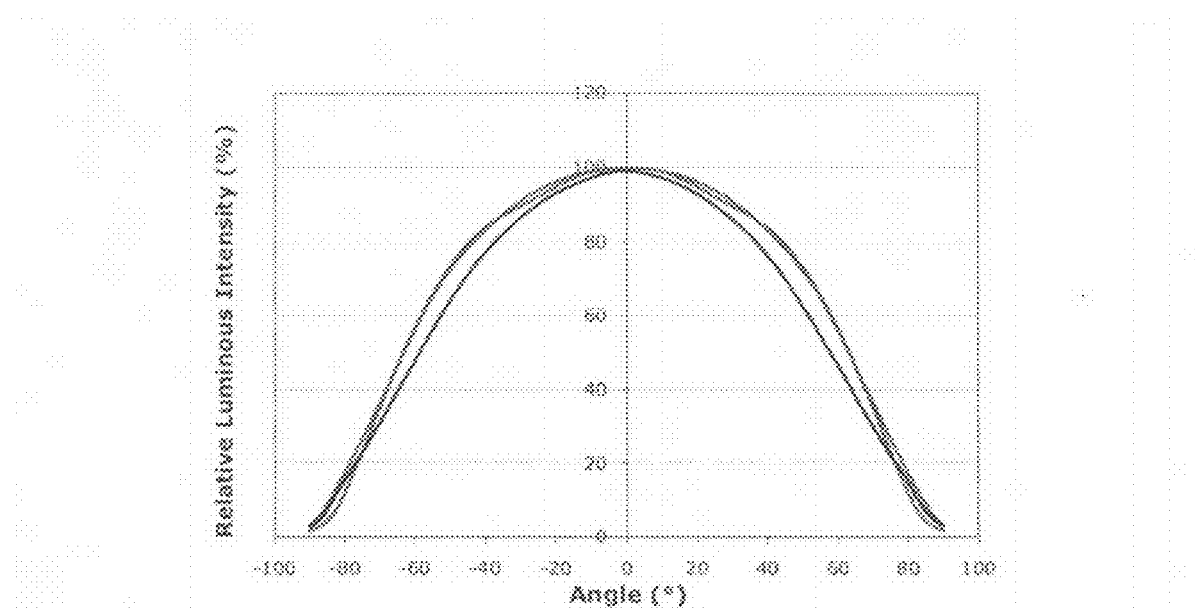
FIGS. 9A-9D illustrate the application of optical design principles for a cylindrical-like shaped optical illumination lens.
Figure 9B:
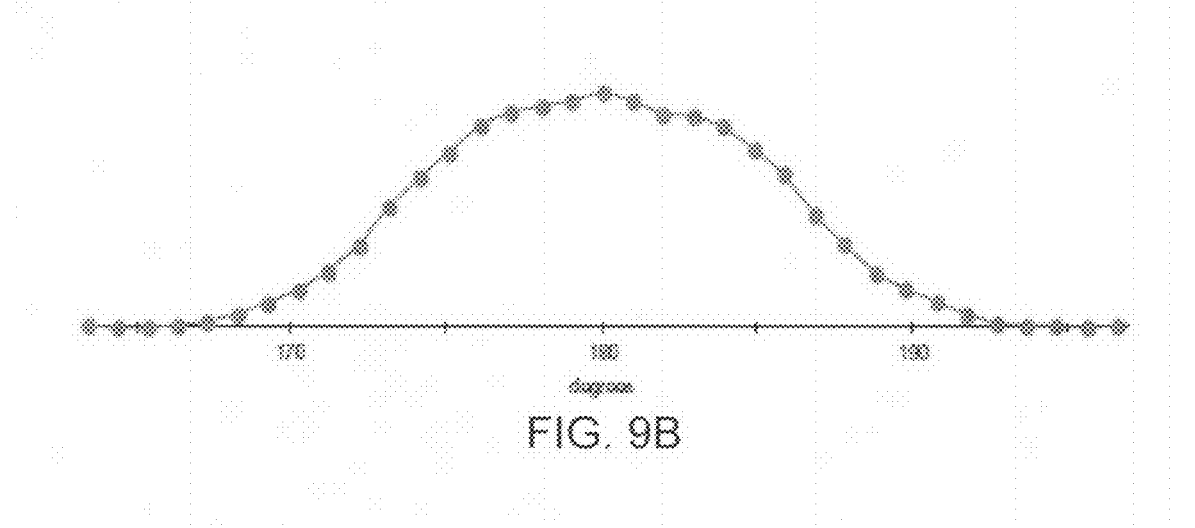
Figure 9C:
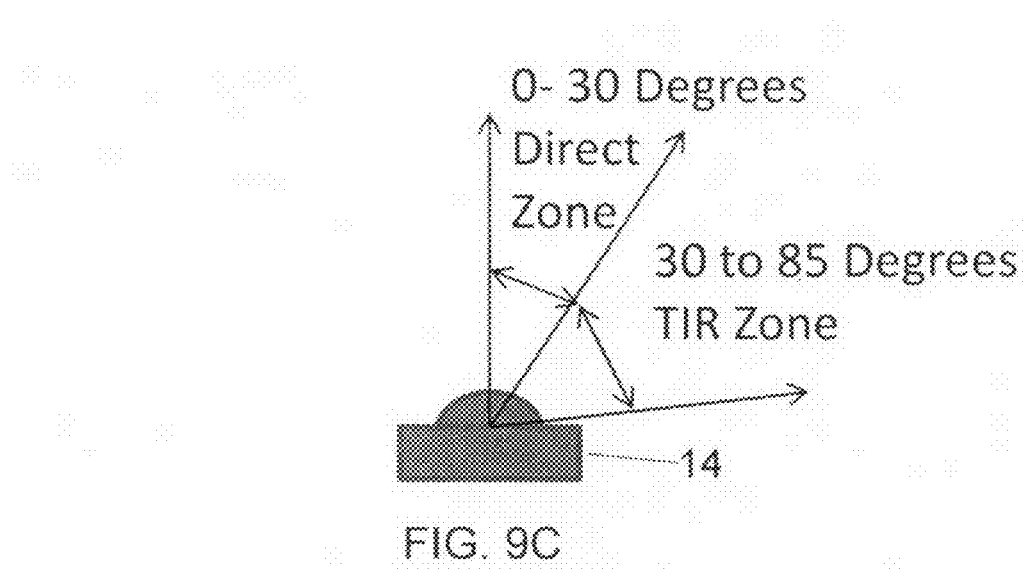
Figure 9D:
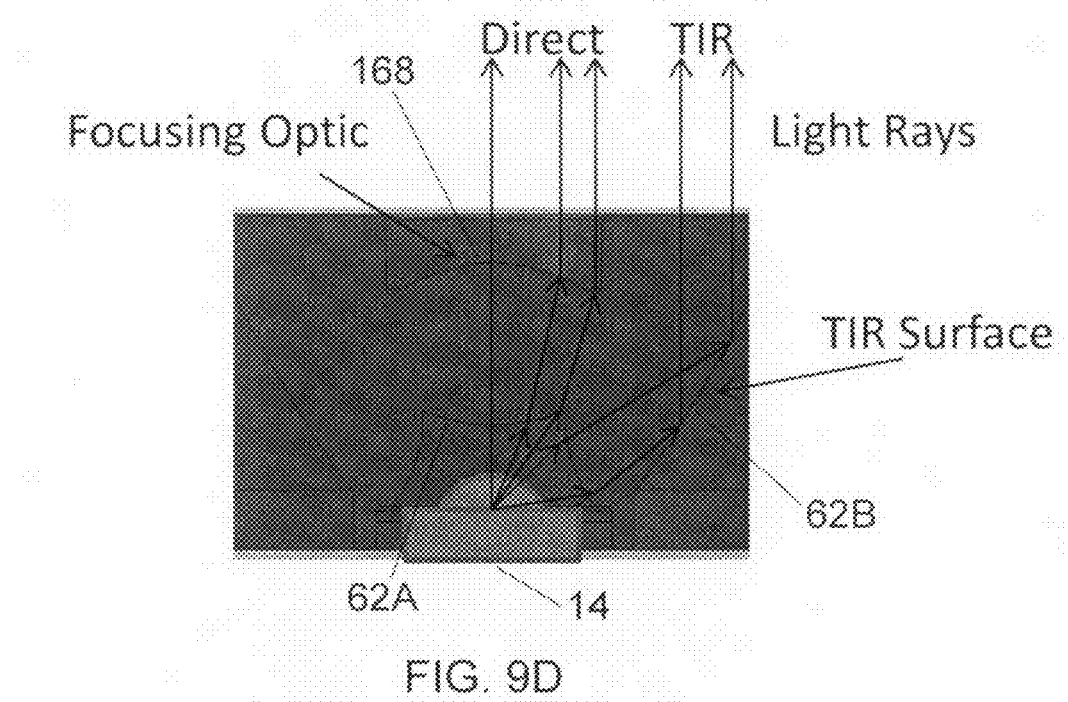

FIGS. 9A-9D illustrate an application of the design process for a lens geometry as shown in FIGS. 6A-6D and described above (e.g., to form a symmetric spot light). FIG. 9A shows the light emission characteristics for a suitable LED light source (e.g., a CREE XP-E LED light source, available from Cree, Durham, N.C.). In FIG. 9A, the top two lines show that red and blue emitted wavelengths have substantially similar intensity distributions as a function of emission angle (i.e., angle from the vertical axis normal to the LED platform and generally aligned with longitudinal axis of a lens in a lens-LED assembly), while the bottom line indicates that the emitted white light has slightly smaller intensity but similar emission angle distribution. Because the lens is intended to function as a symmetric spot light, it is desired to redirect the emitted LED light (which ranges from about −90° to about +90° emission angle) to a more focused emission pattern. Accordingly, FIG. 9B illustrates a desired relative intensity distribution for light emitted from the lens, for example where substantially all of the lens-emitted light has an emission angle from about −10° to about +10° relative to the lens longitudinal axis (i.e., equivalent to the 170° to 190° shown in the figure). Accordingly, a suitable light usage strategy to achieve the distribution shown in FIG. 9B based on the source distribution shown in FIG. 9A is illustrated in FIG. 9C. Specifically, light emitted from the LED 14 with an emission angle between 0° and 30° (or equivalently between −30° and +30°) (i.e., the "direct zone" as labeled) can be redirected/focused to the narrower output distribution. Similarly, light emitted from the LED 14 with an emission angle between 30° and 85° (or equivalently between −85° and −30° or +30° and +85°) (i.e., the "TIR zone" as labeled) can be redirected to the narrower output distribution using TIR principles. FIG. 9D illustrates a cross section of the lens 60 suitable to achieve the desired output. Internal surface 62A and the second surface 168 are convex focusing surfaces that redirect LED light emitted in the direct zone to be substantially parallel with the lens longitudinal axis once emitted from the lens 60. Similarly, internal surface 62B is angled so that it functions as a TIR surface and internally redirects LED light emitted in the TIR zone to be also substantially parallel with the lens longitudinal axis once emitted from the lens 60.

FIGS. 10A-10D illustrate an application of the design process for a lens geometry as shown in FIGS. 7A-7F and described above (e.g., to form an asymmetric spot light or flood light pattern in selected directions). Unlike the axisymmetric geometry of the lens 60, the geometry of the lens 70 is asymmetric about its longitudinal axis, thus resulting in an asymmetric emitted light pattern. Accordingly, the emitted light resulting from the combination of the LED 14 and the lens 70 can be determined as the additive result of simulations from subsections of the lens 70. For example, FIGS. 10A-10C illustrate the projected light intensities/patterns from the second section 78, the valley section 80, and the first section/backstop 77 of the lens 70. FIG. 10D illustrates the cumulative projected light intensity/pattern for the lens 70 as a whole. In the figures, the solid line represents a plane generally bisecting the lens 70 passing through the valley section 80 and separating the first and second sections 77, 78 (e.g., a plane perpendicular to the plane C-C shown in FIGS. 7D and 7F). Accordingly, the resulting emitted light patterns illustrate the use of lens 70 as a street-lighting fixture: most light is forwardly directed to the street-side (or, equivalently, the side corresponding to the second section 78) of the lens 70 by all three lens subsections 77, 78, and 80, while a small portion of light is backwardly directed to the house-side (or, equivalently, the side corresponding to the first section 77 and more generally relating to any building or non-street structure) of the lens 70 by primarily the valley section 80. Accordingly, most of the lighting energy required to power the a light fixture with the lens 70 is efficiently directed to the primary area of interest (i.e., the street), while a small portion of the lighting energy can be conveniently directed backward to a secondary area of interest (e.g., a sidewalk running parallel or otherwise adjacent to the street). The asymmetric lighting pattern of the lens 70 can be used in any setting where it is desirable to preferentially illuminate a selected side (e.g., approximately a 180° arc) of a lamp 200 incorporating the lens 70 (e.g., as also shown in FIG. 4B where most of the light is directed to the sidewalk 205 and minimal or no light is directed to the lawn or other area adjacent the sidewalk 205 and behind the lamp 200).

While the present invention is described herein with reference to illustrated embodiments, it should be understood that the invention is not limited hereto. Those having ordinary skill in the art and access to the teachings herein will recognize additional modifications and embodiments within the scope thereof. Accordingly, such modifications and/or embodiments are considered to be included within the scope of the present invention.

We claim:

1. An illuminating optical lens article of manufacture for use with a light emitting diode (LED) mounted on a circuit board which comprises:
   (a) a lens having a base portion defining a rim on a plane having a bottom surface around a longitudinal axis (A-A) for mounting over the LED;
   (b) an integral refractive outer surface of the lens extending around and angled towards the longitudinal axis (A-A) from the base;
   (c) an integral refractive inner surface of the lens extending from the base forming a cavity shaped and sized to receive an LED; and
   (d) a plurality of grooved sections for receiving an adhesive formed on the bottom surface of the base portion, each of the plurality of grooved sections having a plurality of grooves that extend radially of the longitudinal axis;
   wherein the base is adapted to be mounted on the circuit board onto which the LED is mounted;
   wherein the integral refractive outer and inner surfaces each define a predetermined geometry adapted to direct and focus light emitting from the LED to a predetermined path; and
   wherein the lens is fabricated with a tolerance range of the inner surface within 0.15 mm of the LED.

2. The lens of claim 1 wherein the base, the outer surface, and the inner surface of the lens are formed from as an integral unit fabricated from a polymer.

3. The lens of claim 1 wherein the lens is fabricated from an optically clear acrylic polymer.

4. The lens of claim 1 wherein the lens is fabricated from a polymer that is ultraviolet stabilized.

5. The lens of claim 1 wherein the lens is fabricated from a polymer having a refractive index ranging from about 1.4 to about 1.6.

6. The lens of claim 1 wherein the base defines a diameter between about 10 mm and 20 mm.

7. The lens of claim 1 wherein the base defines an opening for the cavity around and angled towards the longitudinal axis A-A and having a diameter between about 5.0 mm and 5.5 mm.

8. The lens of claim 1 wherein the lens comprises the plurality of grooved sections on the bottom surface of the base portion.

9. The lens of claim 8 wherein the grooved sections are spaced apart by a plurality of flats for molded ejector pins.

10. The lens of claim 8 wherein the grooved sections are adapted to receive a curable polymeric adhesive to be coated and light cured onto the circuit board.

11. The lens of claim 8 wherein the bottom surface of the base defines three equidistant grooved sections spaced apart circumferentially with three flats for ejector pins positioned there between.

12. The lens of claim 1 wherein the outer surface of the lens extends away from the base plane a distance between about 7 mm and 11 mm.

13. The lens of claim 1 wherein the predetermined path is selected whereby when the lens is mounted in a street lamp with a plurality of other lenses, the path emits the light onto a street with minimal light emission away from the street towards undesired locations.

14. The lens of claim 1 wherein the outer surface defines a conical cross-sectional geometry adapted to allow for total internal reflection (TIR), having a first and second section wherein the first section extends upward with respect to the plane of the base and radially inward to a peak and the second section forms a valley extending downward and inward towards the plane of the base.

15. The lens of claim 1 wherein the outer surface defines a cylindrical geometry adapted to allow for total internal reflection (TIR), having a first section extending upward and inward from the plane of the base and a second section defining a plane substantially flat and parallel with the plane of the base defining a center cavity forming a third section with an upward curve that that peaks below the plane of the second section.

16. The lens of claim 1 wherein the outer surface forms a first and a second curved section extending away from the plane of the base adapted to produce an illuminating flood light pattern.

17. The lens of claim 16 wherein the first curved section extends a distance away from the plane of the base greater than the second curved section.

18. The lens of claim 1 wherein the lens is adapted to be mounted into a luminaire system of a plurality of LEDs wherein each LED is positioned into the cavity of a separate individual lens of a plurality of lenses.

19. The lens of claim 18 wherein the luminaire system is a plurality of LED's on a circuit board for a street lamp.

20. The lens of claim 18 wherein the plurality of lenses is between 20 and 100 lenses per luminaire system.

21. A method for assembling an illuminating optical lens system for use with a light emitting diode (LED) comprising the steps of:
(a) providing an LED mounted on a circuit board;
(b) providing a lens comprising (i) a base defining a circumferential rim on a plane having a bottom surface around a longitudinal axis (A-A) adapted to mount to the circuit board; (ii) an integral refractive outer surface of the lens extending around and angled towards the longitudinal axis (A-A) from the base; (iii) an integral refractive inner surface of the lens extending from the base forming a cavity shaped and sized to receive the LED; and (iv) a plurality of grooved sections formed on the bottom surface of the base portion, each of the plurality of grooved sections having a plurality of grooves that extend radially of the longitudinal axis;
(c) applying adhesive to at least one of the lens or the circuit board around the LED for mounting the lens to the circuit board;
(d) mounting the lens to the circuit board over the LED wherein the LED is positioned within the cavity formed by the inner surface of the lens;
wherein the integral refractive outer and inner surfaces each define a predetermined geometry adapted to direct and focus light emitting from the LED to a predetermined path; and
wherein the lens is fabricated with a tolerance range of the inner surface within 0.15 mm of the LED.

22. The method of claim 21 wherein the adhesive is light curable adhesive polymer.

23. The method of claim 22 further comprising the step of emitting light on the adhesive polymer to cure the adhesive polymer.

24. The method of claim 23 wherein the emitting light is ultraviolet light.

25. The method of claim 22 wherein the adhesive polymer is evenly distributed on at least one of the lens or the printed circuit board in four drops circumferentially positioned around the LED.

26. The method of claim 25 wherein the mounting of the lens on the circuit board causes the polymeric adhesive to distribute into the grooves of the bottom surface of the base of the lens.

27. The method of claim 21 comprising performing steps (a)-(d) automatically through a preprogrammed robotic fabrication system.

28. The method of claim 21 further comprising the step of mounting the LED and lens in a luminaire system.

29. The method of claim 28 wherein the luminaire system is a plurality of LED's on a circuit board for a street lamp.

30. The method of claim 28 wherein the luminaire system comprises a plurality of LEDs each positioned in a separate lens.

31. The method of claim 28 wherein the plurality of lenses is between 20 and 100 lenses per luminaire system.

32. A luminaire system comprising:
(a) a plurality of light emitting diode (LED) units mounted on a circuit board;
(b) a plurality of illuminating optical lenses each mounted over and around an LED wherein each lens comprises (i) a base defining a circumferential rim on a plane having a bottom surface around a longitudinal axis (A-A); (ii) an integral refractive outer surface of the lens extending around and angled towards the longitudinal axis (A-A) from the base; (iii) an integral refractive inner surface of the lens extending from the base forming a cavity shaped and sized to receive the LED; wherein the base is adapted to be mounted on the circuit board, and (iv) a plurality of grooved sections for receiving an adhesive formed on the bottom surface of the base portion, each of the plurality of grooved sections having a plurality of grooves that extend radially of the longitudinal axis, wherein the integral refractive outer and inner surfaces each define a predetermined geometry adapted to direct and focus light emitting from the LEDs to a predetermined path; and wherein the lens is fabricated with a tolerance range of the inner surface within 0.15 mm of the LED.

33. The system of claim 32 wherein the lenses achieve efficiencies up to 85% for asymmetric light patterns.

34. The system of claim 32 wherein the lenses achieve efficiencies up to about 92% for symmetric light patterns.

35. The system of claim 32 wherein the luminaire system is a street lamp.

36. The system of claim 32 wherein the plurality of lenses is between 20 and 100 lenses per luminaire system.

37. The system of claim 32 wherein the predetermined path is symmetric.

38. The system of claim 32 wherein the predetermined path is asymmetric.

\* \* \* \* \*